United States Patent
Cerny et al.

(10) Patent No.: US 10,102,094 B2
(45) Date of Patent: Oct. 16, 2018

(54) SIMULATING LEGACY BUS BEHAVIOR FOR BACKWARDS COMPATIBILITY

(71) Applicant: Sony Interactive Entertainment Inc., Tokyo OT (JP)

(72) Inventors: Mark Evan Cerny, Burbank, CA (US); David Simpson, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 37 days.

(21) Appl. No.: 15/411,338

(22) Filed: Jan. 20, 2017

(65) Prior Publication Data

US 2017/0212820 A1  Jul. 27, 2017

Related U.S. Application Data

(60) Provisional application No. 62/286,284, filed on Jan. 22, 2016.

(51) Int. Cl.
| | |
|---|---|
| *G06F 11/00* | (2006.01) |
| *G06F 11/30* | (2006.01) |
| *G06F 13/42* | (2006.01) |
| *G06F 13/40* | (2006.01) |
| *G06F 11/16* | (2006.01) |

(52) U.S. Cl.
CPC ........ *G06F 11/3027* (2013.01); *G06F 11/167* (2013.01); *G06F 13/4022* (2013.01); *G06F 13/4282* (2013.01)

(58) Field of Classification Search
USPC .......................................................... 714/43
See application file for complete search history.

(56) References Cited

U.S. PATENT DOCUMENTS

| | | | |
|---|---|---|---|
| 7,046,245 B2 | 5/2006 | Cerny et al. | |
| 7,081,893 B2 | 7/2006 | Cerny | |
| 7,366,647 B2 * | 4/2008 | Araya ................... | G06F 11/349 703/14 |
| 7,786,993 B2 | 8/2010 | Cerny et al. | |
| 8,031,192 B2 | 10/2011 | Cerny | |
| 8,149,242 B2 | 4/2012 | Langyel et al. | |
| 8,174,527 B2 | 5/2012 | Cerny et al. | |
| 9,495,790 B2 | 11/2016 | Cerny | |
| 2002/0073400 A1 * | 6/2002 | Beuten ................ | G06F 11/3636 717/127 |
| 2004/0255194 A1 * | 12/2004 | Genkin ............... | G06F 11/3688 714/28 |
| 2004/0260993 A1 * | 12/2004 | Griffin ................ | G06F 11/3414 714/743 |
| 2011/0197002 A1 * | 8/2011 | Deng .................... | G06F 11/349 710/110 |
| 2014/0362081 A1 | 12/2014 | Cerny et al. | |
| 2014/0362100 A1 | 12/2014 | Cerny et al. | |

(Continued)

OTHER PUBLICATIONS

U.S. Appl. No. 62/286,284, to Mark Evan Cerny, filed Jan. 22, 2016.

*Primary Examiner* — Sarai E Butler
(74) *Attorney, Agent, or Firm* — JDI Patent; Joshua D. Isenberg; Robert Pullman

(57) ABSTRACT

To address problems that arise due to differences in bus behavior when running a legacy application on a new device the new device may throttle bus performance in a way that emulates the bus behavior of a legacy device when executing the legacy application.

25 Claims, 1 Drawing Sheet

(56) References Cited

U.S. PATENT DOCUMENTS

| | | |
|---|---|---|
| 2014/0362101 A1 | 12/2014 | Cerny et al. |
| 2014/0362102 A1 | 12/2014 | Cerny et al. |
| 2015/0287158 A1 | 10/2015 | Cerny et al. |
| 2015/0287166 A1 | 10/2015 | Cerny |
| 2015/0287167 A1 | 10/2015 | Cerny |
| 2015/0287230 A1 | 10/2015 | Cerny |
| 2015/0287232 A1 | 10/2015 | Cerny |
| 2016/0246323 A1 | 8/2016 | Cerny et al. |
| 2017/0031732 A1 | 2/2017 | Cerny et al. |
| 2017/0031834 A1 | 2/2017 | Cerny et al. |
| 2017/0061671 A1 | 3/2017 | Cerny |

\* cited by examiner

SIMULATING LEGACY BUS BEHAVIOR FOR BACKWARDS COMPATIBILITY

CLAIM OF PRIORITY

This application claims the benefit of prior to commonly-assigned, U.S. Provisional application number 62/284, filed Jan. 22, 2016 the entire contents of which are herein incorporated by reference.

BACKGROUND

When new computer architecture is released it is desirable for the applications written for a previous version of the architecture to run flawlessly on the new architecture. This capability is often referred to as "backwards compatibility." Implementing backwards compatibility involves emulating a target legacy device on the new host architecture so that the new architecture can execute the instructions of programs written for the legacy. Computer architectures change over time to take advantage of technological advances in busses, clock speed, processor architecture, caching, standards, etc. When one computer architecture is replaced by a newer architecture the older architecture becomes what is called a legacy architecture. Over the course of its development software applications, such as network protocols, user interfaces, audio processing, device drivers, graphics processing, messaging, word processors, spreadsheets, database programs, games, and other applications are written for a legacy architecture. Such legacy software still has value to its users even if they upgrade to a new architecture. A need therefore exists to be able to run legacy software on the new architecture.

Differences in performance of the hardware components of a new device and a legacy device can cause errors in synchronization on the new device, which may cause a legacy application to crash when running on a new device architecture. Such differences in performance can arise, e.g., from differences in bus architecture between the new and legacy devices. A bus architecture provides multiple data paths between different device components. A legacy device and a new device can have different bus paths between device components with different constraints on timing and data transfer rates between device components. For example, if a bus path between two components of the new device is faster than a corresponding bus path between these components on the legacy device data still being used by one component may be prematurely overwritten by another component.

SUMMARY

To address problems that arise due to differences in bus behavior when running a legacy application on a new device the new device may throttle bus performance in a way that emulates the bus behavior of a legacy device when executing the legacy application.

Bus throttling on the new system may be based on estimated bandwidth allocations determined from behavior of the legacy bus. Bus traffic may be throttled by limiting the amount of available bus bandwidth allocated for particular bus transactions according to amounts estimated from the legacy bus behavior. The bus traffic is throttled so that the new device allocates at least as much bandwidth as would have been allocated by the legacy system, but not so much more that synchronization errors arise in execution of a legacy application. The throttling can be tuned while running legacy applications on the new device to determine how much additional bandwidth allocation causes problems with execution.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the claimed invention. Accordingly, the exemplary embodiments of the invention described below are set forth without any loss of generality to, and without imposing limitations upon, the claimed invention.

Figure 1:
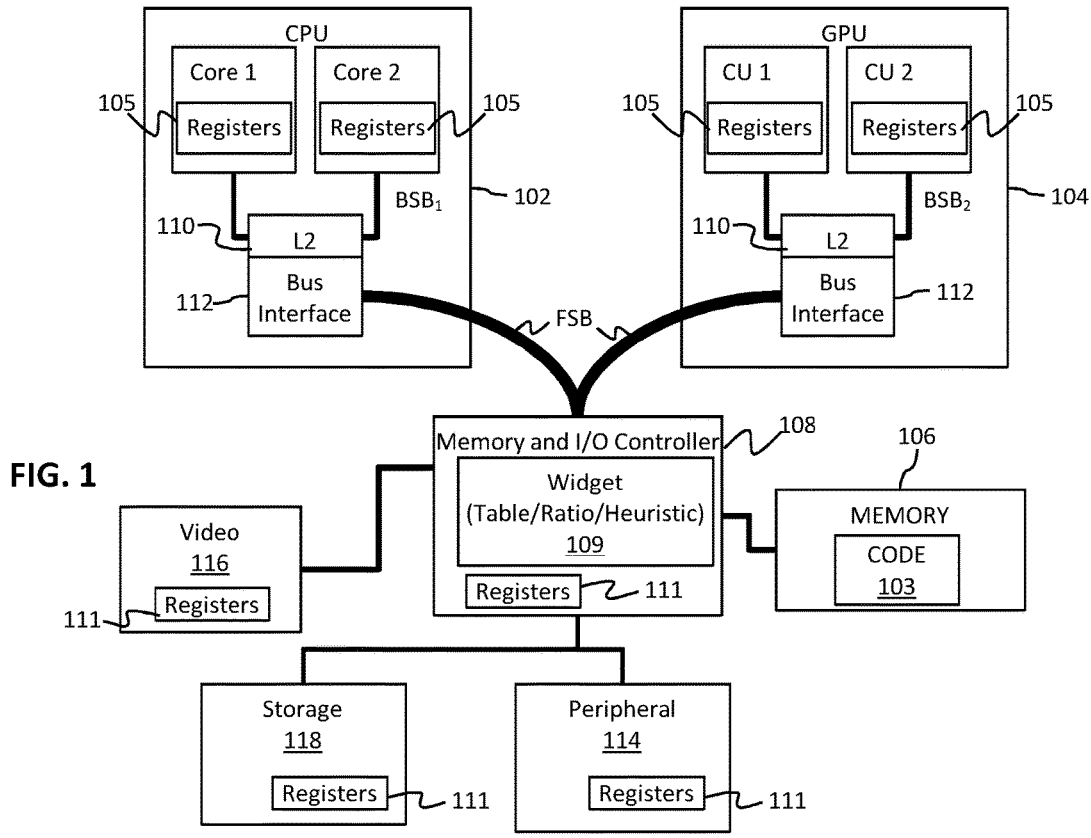
FIG. 1 is a block diagram depicting a device configured to account for differences in bus architecture between new and legacy devices according to aspects of the present disclosure.

FIG. 1 shows an example a new device configured to account for differences in bus architecture between a legacy device and the new device when running applications written for the legacy device. In this example, the new device may include a multicore CPU and a multicore GPU coupled to a common memory 106 and I/O access controller 108. Each CPU or GPU core is coupled to a level 2 cache 110 and bus interface unit 112 via backside buses ($BSB_1$, $BSB_2$). The level 2 cache 110 is coupled to the memory 106 and I/O access controller 108 by a frontside bus (FSB). Additional memory (not shown), peripheral devices 114, video 116, and data storage devices 118 interface with the CPU and GPU through the access controller by various busses. The CPU and GPU may include configurable registers 105 for temporary storage of data and/or instructions. A legacy version of the device in FIG. 1 might have a different architecture, e.g., one in which there are separate busses for the CPU and GPU and in which there are separate controllers for memory and I/O access.

In the example shown in FIG. 1, the access controller 108 throttles bus performance to emulate legacy bus behavior and maintain synchronization when executing legacy applications, e.g., by executing code instructions 103 stored in the memory 106. The access controller throttles 108 bus traffic on the various busses $BSB_1$, $BSB_2$, FSB by allocating available bus bandwidth in a way that emulates the behavior of the bus in a legacy device. The throttling is informed by bus performance data for the legacy device. To generate this data the legacy device may be tested while running a legacy application. Bus bandwidth allocations for different bus clients are measured under different conditions. Factors that might affect bandwidth allocated for a specific bus transaction include the specific bus clients that are accessing the bus (e.g., CPU 102 or GPU 104), the source or destination (e.g., memory 106) for data transmitted over the bus, whether data is being read or written, whether the transaction has a high or low priority, the amount of bandwidth being requested, which other bus clients are competing for bus bandwidth, etc. All of these factors may be recorded during testing of the legacy device along with the bus bandwidth allocations.

There are at least three approaches to emulating the legacy bus behavior: a table driven approach, a ratio driven approach, and a heuristic approach. All three approaches look at the bandwidth that the legacy device actually allocates to different clients under different circumstances and to replicate those allocations with the new device under the same or similar circumstances. During a testing stage, bandwidth allocations on the old hardware between specific clients and specific resources (or between specific clients) are measured under different circumstances. The measured bandwidth allocation values are put into a table or ratio or heuristic on the new hardware.

Table-Driven Approach

In the table-driven approach the new device uses a lookup table stored in memory 106 or configurable registers 105 to allocate bandwidth between nodes under different bus traffic conditions. As a simple example, suppose there are two bus clients A and B competing for 30 MB/s of available bus bandwidth for memory transactions. Table I below shows allocated bandwidth between clients A and B based on measured performance (i.e., bus bandwidth allocation) for the legacy device.

TABLE I

| | | Bandwidth Requested by Client A | | | |
|---|---|---|---|---|---|
| | | 0 | 10 | 20 | 30 |
| Bandwidth | 0 | 0/0 | 0/10 | 0/20 | 0/30 |
| Requested | 10 | 10/0 | 10/10 | 10/20 | 8/22 |
| By Client B | 20 | 20/0 | 20/10 | 15/15 | 12/18 |
| | 30 | 30/0 | 25/5 | 20/10 | 15/15 |

In Table I, the allocated bandwidth for given requested bandwidths is denoted AB where A is the bandwidth allocated to client A and B is the bandwidth allocated to client B. The values in Table I may be determined by monitoring the bus bandwidth allocation of the legacy device during normal operation with legacy applications. A number of factors other than requested bandwidth may affect the bandwidth allocation, e.g., whether the bandwidth is requested for read or write operations, the relative priority of A's and B's requests. The table may take these factors into account.

Ratio Approach

The ratio approach is similar to the table-driven approach, except that the table stored in memory 106 or configurable registers 105 would specify bandwidth allocations in terms of ratios. For example, Table II shows the bandwidth requests and allocations in terms of percentages of the maximum available bus bandwidth.

TABLE II

| | | Bandwidth Requested by Client A | | | |
|---|---|---|---|---|---|
| | | 0% | 33% | 67% | 100% |
| Bandwidth | 0% | 0:0 | 0:33% | 0:67% | 0:100% |
| Requested | 33% | 33%:0 | 33%:33% | 33%:67% | 27%:73% |
| By Client B | 67% | 67%:0 | 67%:33% | 50%:50% | 40%:60% |
| | 100% | 100%:0 | 80%:20% | 67%:33% | 50%:50% |

Bandwidth Requested by Client A

Although two-dimensional examples are shown above, the table or ratio approach may be expanded to three, four or more dimensions to accommodate three, four or more different bus clients. Also, if there are multiple different busses serving different groups of clients, the table or ratio may take this into account.

Heuristic Approach

Figure 2:
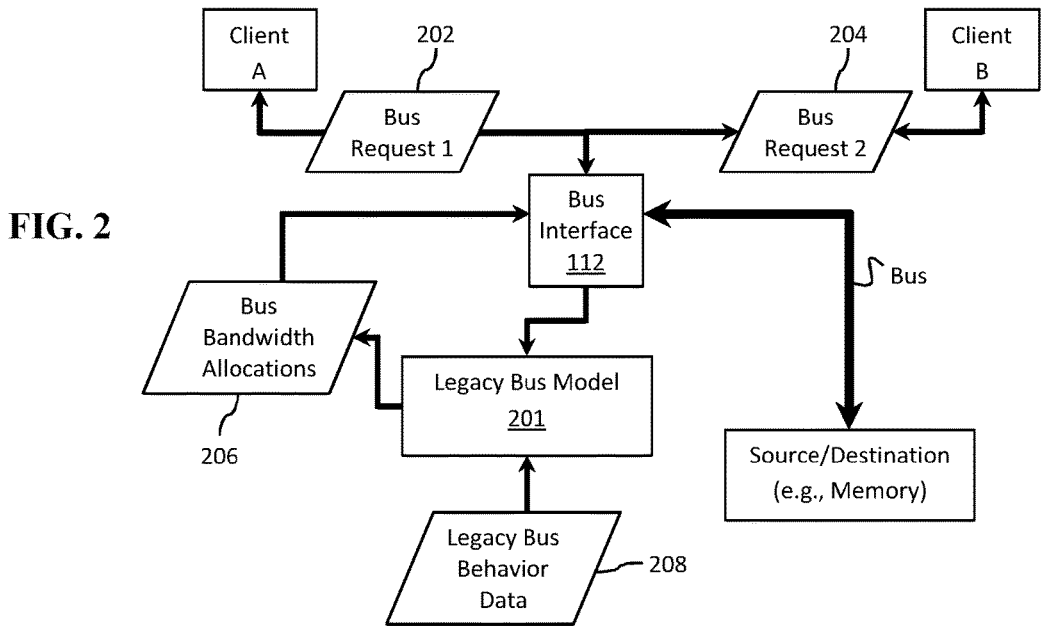
FIG. 2 is a flow diagram illustrating a heuristic approach to determining bandwidth allocation in accounting for differences in bus architecture between new and legacy devices according to aspects of the present disclosure.

The heuristic approach uses a computer model 201 of the legacy bus behavior to determine bandwidth allocation. FIG. 2 shows an example. For a given bus transaction between clients A and B, the heuristic receives inputs regarding current bus traffic, bandwidth requested, client(s) requesting bandwidth, destination for traffic, etc. In FIG. 2, the inputs are the bandwidth requests 202, 204 from client A and client B, respectively. The heuristic then models the behavior of the bus paths between clients A and B, the bus arbitration 206, etc. using data 208 regarding the behavior of the legacy bus under the same or similar circumstances. The legacy bus behavior data may be stored in a local memory for quick access by the heuristic. The modeling takes into account the bandwidth requests, current bus conditions, and the legacy bus data into account to determine estimated bus bandwidth allocations for client A and client B. A bus controller, e.g., bus interface 112, can use these allocations to throttle the bus traffic.

The table, ratio, and heuristic approaches are more concerned with how legacy bus bandwidth is allocated under given circumstances than why. Legacy bus bandwidth arbitration could depend on whether data is being read from or written to the client, whether the transaction has a high or low priority, the amount of bandwidth being requested, etc. If the legacy bus bandwidth allocations are sufficiently predictable they can be replicated with the table, ratio or heuristic approach.

The widget does not have to be implemented by the memory 106 and I/O controller 108. In alternative implementations, bus clients A, B could self-throttle. Specifically, each bus client could include a widget 109 that looks at the bus traffic to determine whether it would have been asking the legacy system for more bandwidth than it could handle and would hold back on the request until it determines that sufficient bandwidth would have been available. Each of these widgets could access a table, ratios, or a heuristic stored in configurable registers 111.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112(f).

What is claimed is:

1. A method to address problems that arise due to differences in bus behavior when running a legacy application on a new device, the method comprising:
   throttling bus performance on the new device in a way that emulates bus behavior of a legacy device when executing the legacy application.

2. The method of claim 1, wherein throttling bus performance on the new device is based on estimated bandwidth allocations determined from behavior of the legacy bus.

3. The method of claim 1, wherein throttling bus performance on the new device includes limiting an amount of available bus bandwidth allocated for particular bus transactions according to amounts estimated from behavior of a legacy bus on the legacy device.

4. The method of claim 1, wherein throttling bus performance on the new device includes throttling bus traffic on the new device so that the new device allocates at least as much bandwidth as would have been allocated by the legacy system, but not so much more that synchronization errors arise in execution of a legacy application.

5. The method of claim 1, wherein throttling bus performance on the new device includes tuning the of the bus performance while running legacy applications on the new device to determine how much additional bandwidth allocation causes problems with execution.

6. The method of claim 1, wherein the new device uses a lookup table stored in a memory or configurable hardware registers to allocate bandwidth between nodes of the device under different bus traffic conditions.

7. The method of claim 1, wherein throttling bus performance on the new device includes using a computer model of the legacy bus behavior to determine bandwidth allocation.

8. The method of claim 1, wherein the new device uses one or more ratios stored in a memory or configurable hardware registers to allocate bandwidth between nodes of the device under different bus traffic conditions.

9. A system, comprising:
one or more processors;
a memory operably coupled to the one or more processors by one or more busses;
executable instructions stored in the memory and executable by the processor that when executed cause the processor to implement a method to address problems that arise due to differences in bus behavior when running a legacy application with the system, the method comprising:
throttling bus performance on the one or more busses in a way that emulates bus behavior of a legacy device when executing the legacy application.

10. The system of claim 9, wherein throttling bus performance on the one or more busses is based on estimated bandwidth allocations determined from behavior of the legacy bus.

11. The system of claim 9, wherein throttling bus performance on the one or more busses includes limiting an amount of available bus bandwidth allocated for particular bus transactions according to amounts estimated from behavior of a legacy bus on the legacy device.

12. The system of claim 9, wherein throttling bus performance on the one or more busses includes throttling bus traffic on the new device so that the new device allocates at least as much bandwidth as would have been allocated by the legacy system, but not so much more that synchronization errors arise in execution of a legacy application.

13. The system of claim 9, wherein throttling bus performance on the one or more busses includes tuning the of the bus performance while running legacy applications on the new device to determine how much additional bandwidth allocation causes problems with execution.

14. The system of claim 9, wherein throttling bus performance on the one or more busses includes using a lookup table stored in a memory or configurable hardware registers to allocate bandwidth between nodes of the device under different bus traffic conditions.

15. The system of claim 9, wherein throttling bus performance on the one or more busses includes using a computer model of the legacy bus behavior to determine bandwidth allocation.

16. The system of claim 9, wherein throttling bus performance on the one or more busses includes using one or more ratios stored in a memory or configurable hardware registers to allocate bandwidth between nodes of the device under different bus traffic conditions.

17. The system of claim 9, wherein the one or more processors include one or more central processor units.

18. A non-transitory computer-readable medium having embodied therein executable instructions configured to cause a computing device to implement a method to address problems that arise due to differences in bus behavior when running a legacy application on a new device, the method comprising:
throttling bus performance on the new device in a way that emulates bus behavior of a legacy device when executing the legacy application.

19. The non-transitory computer-readable medium of claim 18, wherein throttling bus performance on the new device is based on estimated bandwidth allocations determined from behavior of the legacy bus.

20. The non-transitory computer-readable medium of claim 18, wherein throttling bus performance on the new device includes limiting an amount of available bus bandwidth allocated for particular bus transactions according to amounts estimated from behavior of a legacy bus on the legacy device.

21. The non-transitory computer-readable medium of claim 18, wherein throttling bus performance on the new device includes throttling bus traffic on the new device so that the new device allocates at least as much bandwidth as would have been allocated by the legacy system, but not so much more that synchronization errors arise in execution of a legacy application.

22. The non-transitory computer-readable medium of claim 18, wherein throttling bus performance on the new device includes tuning the of the bus performance while running legacy applications on the new device to determine how much additional bandwidth allocation causes problems with execution.

23. The non-transitory computer-readable medium of claim 18, wherein the new device uses a lookup table stored in a memory or configurable hardware registers to allocate bandwidth between nodes of the device under different bus traffic conditions.

24. The non-transitory computer-readable medium of claim 18, wherein throttling bus performance on the new device includes using a computer model of the legacy bus behavior to determine bandwidth allocation.

25. The non-transitory computer-readable medium of claim 18, wherein the new device uses one or more ratios stored in a memory or configurable hardware registers to allocate bandwidth between nodes of the device under different bus traffic conditions.

* * * * *